United States Patent [19]
Maezawa

[11] Patent Number: 5,748,584
[45] Date of Patent: May 5, 1998

[54] OPTICAL DISK DEVICE HAVING A FOCUS OFFSET CONTROLLER

[75] Inventor: Etsuo Maezawa, Tokyo, Japan

[73] Assignee: NEC Corporation, Japan

[21] Appl. No.: 620,125

[22] Filed: Mar. 21, 1996

[30] Foreign Application Priority Data

Mar. 22, 1995 [JP] Japan .................. 7-062325

[51] Int. Cl.[6] .............................. G11B 7/095
[52] U.S. Cl. .................. 369/44.29; 369/44.34; 369/44.35; 369/54
[58] Field of Search ............. 369/44.29, 44.34, 369/44.35, 44.36, 54

[56] References Cited

U.S. PATENT DOCUMENTS

| 4,669,074 | 5/1987 | Hsieh et al. | 369/44.35 |
|---|---|---|---|
| 4,730,294 | 3/1988 | Funada | 369/44.35 |
| 4,823,330 | 4/1989 | Arter et al. | 369/44.35 |
| 4,907,212 | 3/1990 | Pharris et al. | 369/54 X |
| 5,164,932 | 11/1992 | Fennema et al. | 369/44.29 |
| 5,475,664 | 12/1995 | Shimizume et al. | 369/44.29 |

FOREIGN PATENT DOCUMENTS

| 2-94033 | 4/1990 | Japan . |
|---|---|---|
| 2177133 | 7/1990 | Japan . |

Primary Examiner—Thang V. Tran
Attorney, Agent, or Firm—Hayes, Soloway, Hennessey, Grossman & Hage, P.C.

[57] ABSTRACT

An optical disk device is provided which enables the focus offset to be automatically adjusted with a high accuracy. In automatic control in a microcomputer, initial focus offset adjusting data (AO) are first output, and the data is stepwise changed from the initial value AO. In this case, a difference in phase between reproduced EFM signals and channel clocks is integrated in an integration circuit at given time intervals, and, thereafter, focus offset adjusting data, which provide the minimum phase difference integration data, are output as the optimal focus offset adjusting data.

1 Claim, 6 Drawing Sheets

OPTICAL DISK DEVICE HAVING A FOCUS OFFSET CONTROLLER

FIELD OF THE INVENTION

This invention relates to an optical disk device and more particularly to a focus offset adjuster unit in focus servo of an optical disk device.

BACKGROUND OF THE INVENTION

In an optical disk device, the offset of focus servo is generally manually adjusted with a volume or the like in assembling the device. In this case, a point where the amplitude of reproduced signals becomes maximum is regarded as the optimal focusing point to adjust the focus offset.

A conventional focus offset adjuster unit in focus servo of an optical disk device comprises a circuit for generating a focus offset adjusting signal by manually adjusting a volume, an add circuit for adding the adjusting signal and a focus error signal supplied from an optical head amplifier to generate an adjusted focus error signal, a circuit for generating a focus servo signal in accordance with the adjusted focus error signal, and a focus actuator for correcting a focus error in accordance with the focus servo signal.

In operation, an operator manually adjusts the volume, while the operator monitors a reproduced signal supplied from the optical head amplifier, so that the volume is manually fixed at a position where an amplitude of the reproduced signal becomes maximum.

In the conventional focus offset adjustor unit, however, there is a disadvantage in that a specialist is required at a factory or assembly site, although the detail will be explained in the paragraphs prior to the disclosures of preferred embodiments.

In order to solve this problem, Japanese Patent Laid-Open Nos. 94033/1990 and 177133/1990 disclose methods for automatically adjusting focus offset. According to the method disclosed in the former publication, Japanese Patent Laid-Open No. 94033/1990, an error rate detection circuit for detecting the error rate of data read from a disk Is provided, and the DC offset value is automatically adjusted so that the error rate becomes minimum.

On the other hand, according to the method disclosed in the latter publication, Japanese Patent Laid-Open No. 177133/1990, the focus offset voltage is varied stepwise, a peak level of reproduced signals at that time is detected, and the focus offset voltage which provides the maximum peak level is used as a focus offset adjusting signal.

In the methods disclosed in Japanese Patent Laid-Open Nos. 94033/1990 and 177133/1990, automatic focus offset adjustment is possible, and actuation of the automatic adjusting function at the time of turning the power on enables a variation in focus offset attributable to a change with the elapse of time to be adjusted.

The former method wherein the focus offset is adjusted according to the data error rate value, however, is on the premise that the occurrence of data error is proportional to the focus offset. Therefore, the occurrence of data error unattributable to the focus offset makes it impossible for the focus offset to be accurately adjusted.

On the other hand, the latter method wherein the focus offset is adjusted according to the peak of reproduced signals has a drawback that, since the peak value of reproduced signals does not always correspond to the just focus point, the focus offset cannot be accurately adjusted.

SUMMARY OF THE INVENTION

An object of the present invention is to provide a highly reliable optical disk device which enables the focus offset to be adjusted automatically and accurately.

According to an aspect of the present invention, there is provided an optical disk device comprising means for producing focus error signals regarding light applied to an optical disk; means for producing reproduced signals from the optical disk by means of the applied light; means for producing binary data signals of the reproduced signals and channel clock signals contained therein; phase difference production means for producing phase difference signals showing a difference in phase between the binary data signals and the channel clock signals; focus offset adjusting signal production means for producing focus offset adjusting signals according to the phase difference signals; and means for adding the focus offset adjusting signals to the focus error signals to produce focus servo signals.

The present invention utilizes the fact that the difference in phase between reproduced EFM (eight to fourteen modulation) signals and channel clocks exactly corresponds to the focus offset. Specifically, focus offset adjusting signals for minimizing the difference in phase between reproduced EFM signals and channel clocks is detected in an early stage after turning the power on, and, thereafter, the focus offset adjusting signals are stored and continuously output until the power is turned off, thereby realizing accurate focus servo.

PREFERRED EMBODIMENTS OF THE INVENTION

Before explaining an optical disk device in a preferred embodiment according to the invention, the aforementioned conventional optical disk device will be explained in more detail in FIG. 1.

Figure 1:
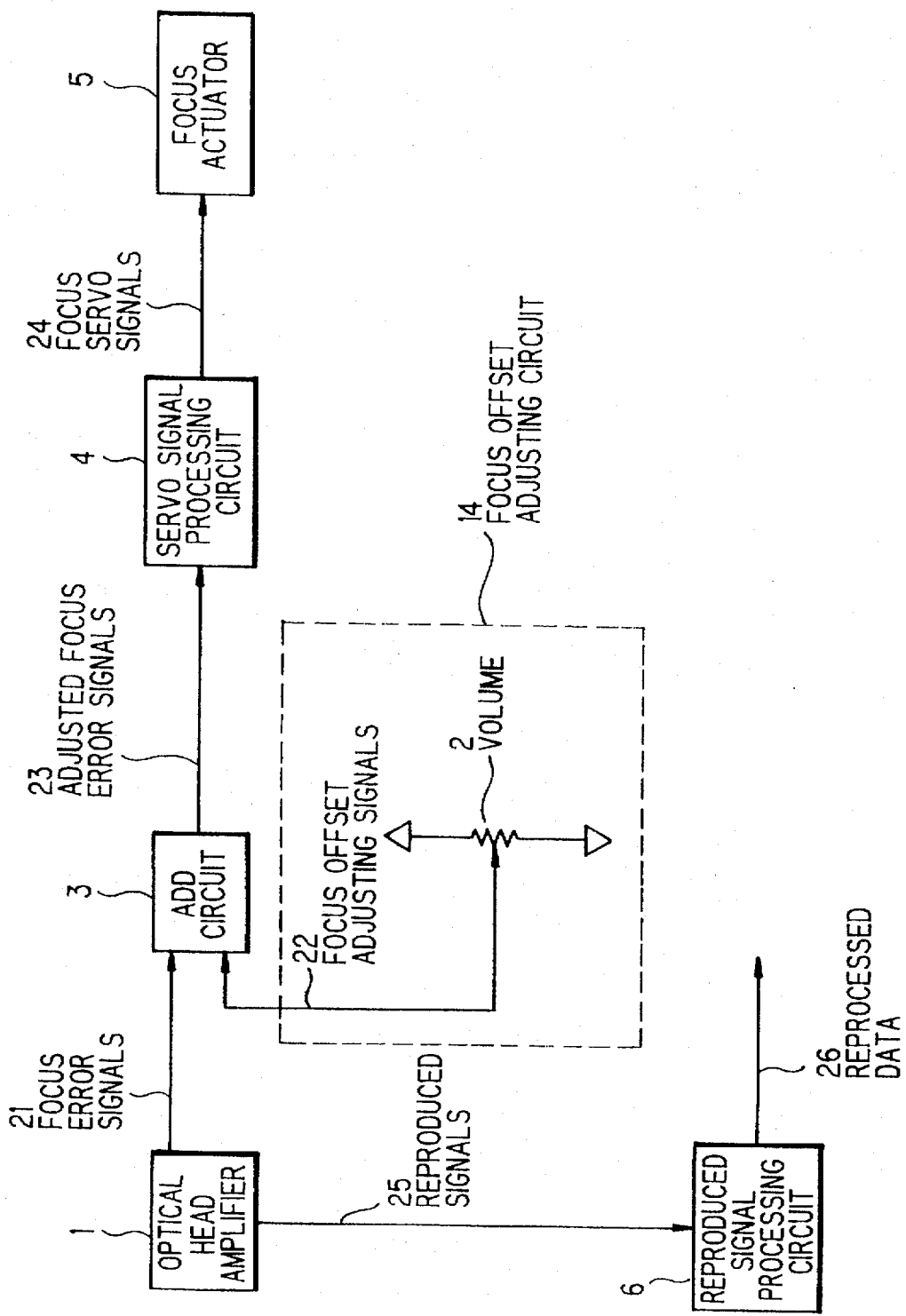
FIG. 1 is a block diagram of a focus offset adjuster unit in the conventional optical disk device.

FIG. 1 is a block diagram showing the conventional type of focus offset adjustment. In FIG. 1, focus error signals 21 produced in an optical head amplifier 1 are added to focus offset adjusting signals 22, manually adjustable by means of a volume 2, in an add circuit 3. Adjusted focus error signals 23, which have been subjected to offset adjustment, are input into a servo processing circuit 4, where the adjusted focus error signals 23 are converted to focus servo signals 24 for driving a focus actuator 5. On the other hand, reproduced signals 25 from the optical head amplifier 1 are led as reproduced data 26 through a reproduced signal processing circuit 6.

In the above construction, when the optical disk device with a disk medium having recorded information inserted thereinto is in operation for reproduction of the information, an operator manually adjusts a volume 2 of a focus offset adjustment circuit 14 while monitoring reproduced signals 25 using a wave-form observer to fix the volume 2 at a position where the amplitude of the reproduced signals becomes maximum. Thus, the focus offset adjustment is completed.

In the example shown in FIG. 1, the focus offset is adjusted manually rather than automatically. This requires for the above adjustment to be performed by a specialist at the time of delivery from factory or assembly of the device. Therefore, the above method cannot cope with a variation in focus offset attributable to a change with the elapse of time or a change in temperature.

Embodiments of the present invention will now be described with reference to the accompanying drawings.

Figure 2:
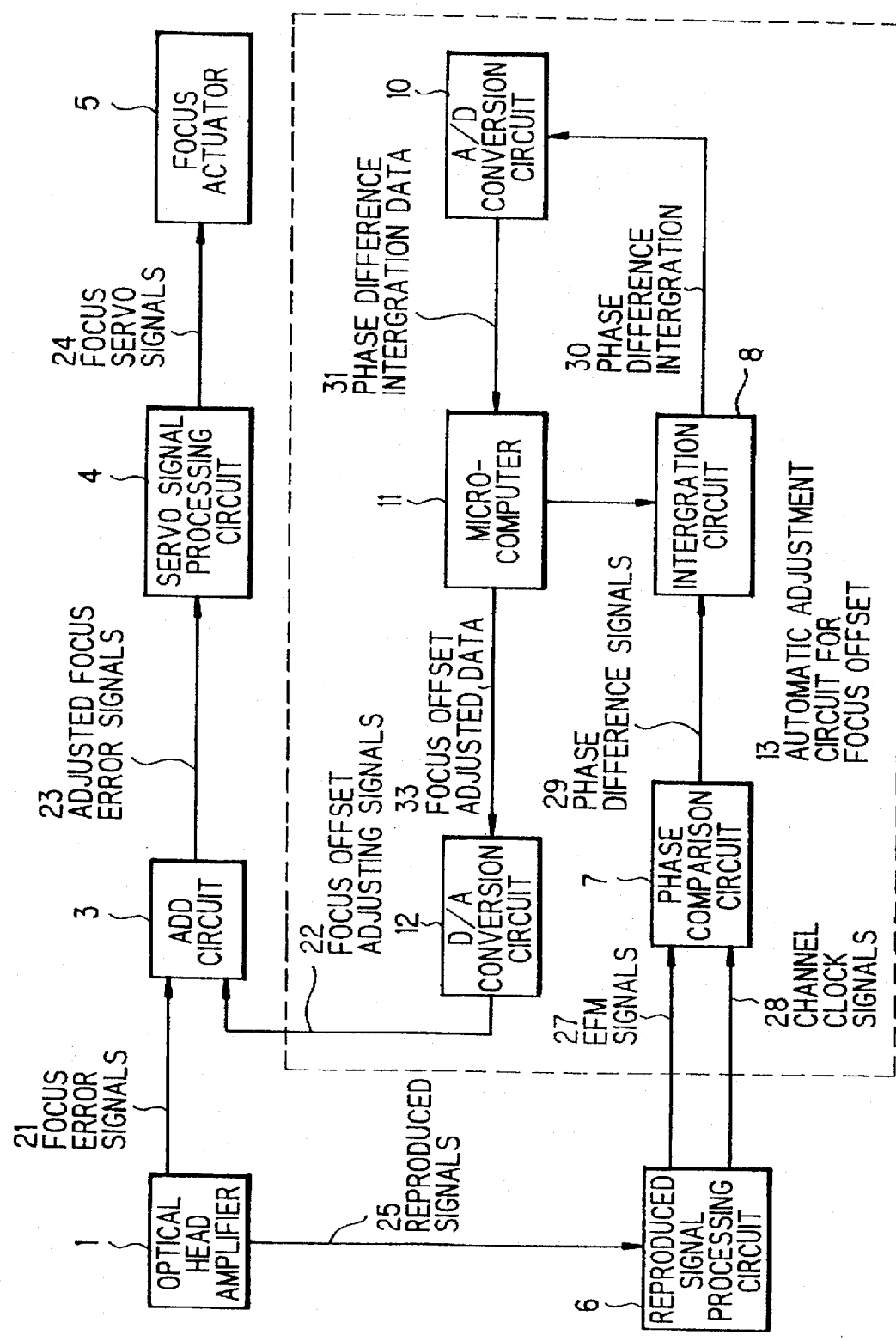
FIG. 2 is a block diagram showing a preferred embodiment of the present invention.

FIG. 2 is a block diagram, showing an embodiment of the present invention, which illustrates only sections associated with automatic adjustment of focus offset. In FIG. 2, an optical head amplifier 1 outputs focus error signals 21 and reproduced signals 25. The reproduced signals 25 are input into a reproduced signal processing circuit 6, and EPM signals 27 and channel clock signals 28 are output from the reproduced signal processing circuit 6. A phase comparison circuit 7 serves to produce phase difference signals 29 (for example, exclusive "or") between the EFM signals 27 and the channel clock signals 28 output from the reproduced signal processing circuit 6.

An integration circuit 8 integrates phase difference signals 29 in a given time period from edge to edge in an integration clock 32 generated from a microcomputer 11 to give phase difference integration signals 30 which are then output from the integration circuit 8. An A/D conversion circuit 10 converts the phase difference integration signals 30 to phase difference integration data 31, digital data recognizable by the microcomputer 11, which are then output to the microcomputer 11.

The microcomputer 11 produces integration clocks 32 of duty ratio 50%, and phase difference integration date 31 read for each edge timing of the integration clocks 32 are compared to perform the operation of focus offset adjusting data 33, smaller than the last phase difference integration data 31, which are then output to a D/A conversion circuit 12. The D/A conversion circuit 12 converts the focus offset adjusting data 33 to focus offset adjusting signals 22 as analog signals.

In an add circuit 3, the focus error signals 21 are added to the focus offset adjusting signals 22 to provide adjusted focus error signals 23 which are output to a servo signal processing circuit 4. The adjusted focus error signals 23 are input into the servo signal processing circuit 4, and focus servo signals 24 are output from the servo signal processing circuit 4. A focus actuator 5 is driven by the focus servo signals 24.

An automatic adjustment circuit for focus offset 13 comprises the phase comparison circuit 7, the integration circuit 8, the A/D conversion circuit 10, the microcomputer 11, and the D/A conversion circuit 12.

Figure 3:
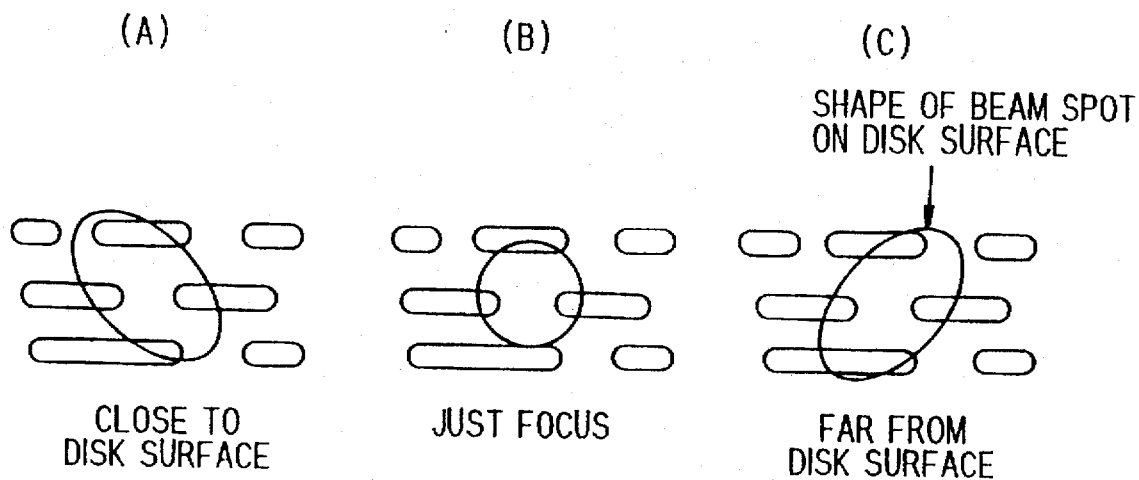
FIG. 3 is a diagram showing a beam form around a beam focus on a disk.

In this connection, it should be noted that the adjustment of focus offset is made with a view to making reproduced signals (eye pattern) clear and, hence, setting should be done so that a beam is continuously applied to the reflecting surface of the disk so as to coincide with a focus where a beam spot is most concentrated. Even slight deviation from this just focus state (state shown in FIG. 3 (B)) causes the diameter of a spot on the disk to become larger as shown in FIGS. 3 (A) or (C), deteriorating the eye pattern of the reproduced signals. This creates crosstalk due to reflected and diffracted light from bits around the spot or adjacent tracks, resulting in increased jitter. The jitter then creates a difference in phase between EFM signals and channel clock signals. Therefore, the adjustment of focus offset so as to eliminate the phase difference provides clearly reproduced signals having no significant jitter, consequently making it possible to adjust the focus offset.

Since EFM signals are self-clock signals, the channel clock is extracted from the reproduced EFM signals per se with a PLL (a phase-locked loop) circuit to digitize the signals (i.e., to judge whether the data are "1" or "0"). In this case, when the jitter of reproduced signals is large, time-base fluctuation of clock extracted with the PLL circuit also becomes large.

Figure 4:
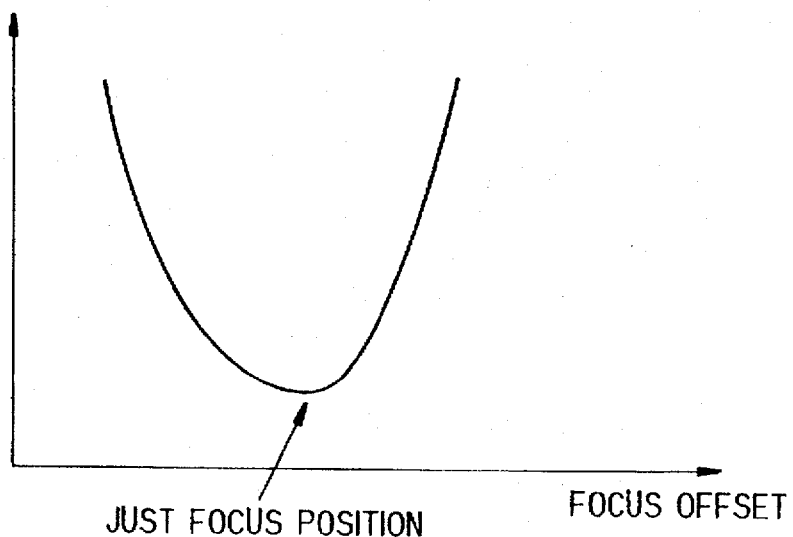
FIG. 4 is a diagram showing the relationship between the focus offset and the difference in phase between reproduced signals and channel clocks.

Both the reproduced signals and the channel clock signals fluctuate, the difference in phase therebetween becomes very large. On the other hand, in the just focus state, the phase difference always becomes the minimum volume determined by the performance of the PLL circuit or the like. Therefore, when the time average (time integration) of the difference in phase between the reproduced signals and the channel clocks is plotted, as shown in FIG. 4, the phase difference becomes minimum in the just focus point and increases with increasing the distance from the just focus point. The focus offset is automatically adjusted by taking advantage of this property.

Figure 5:
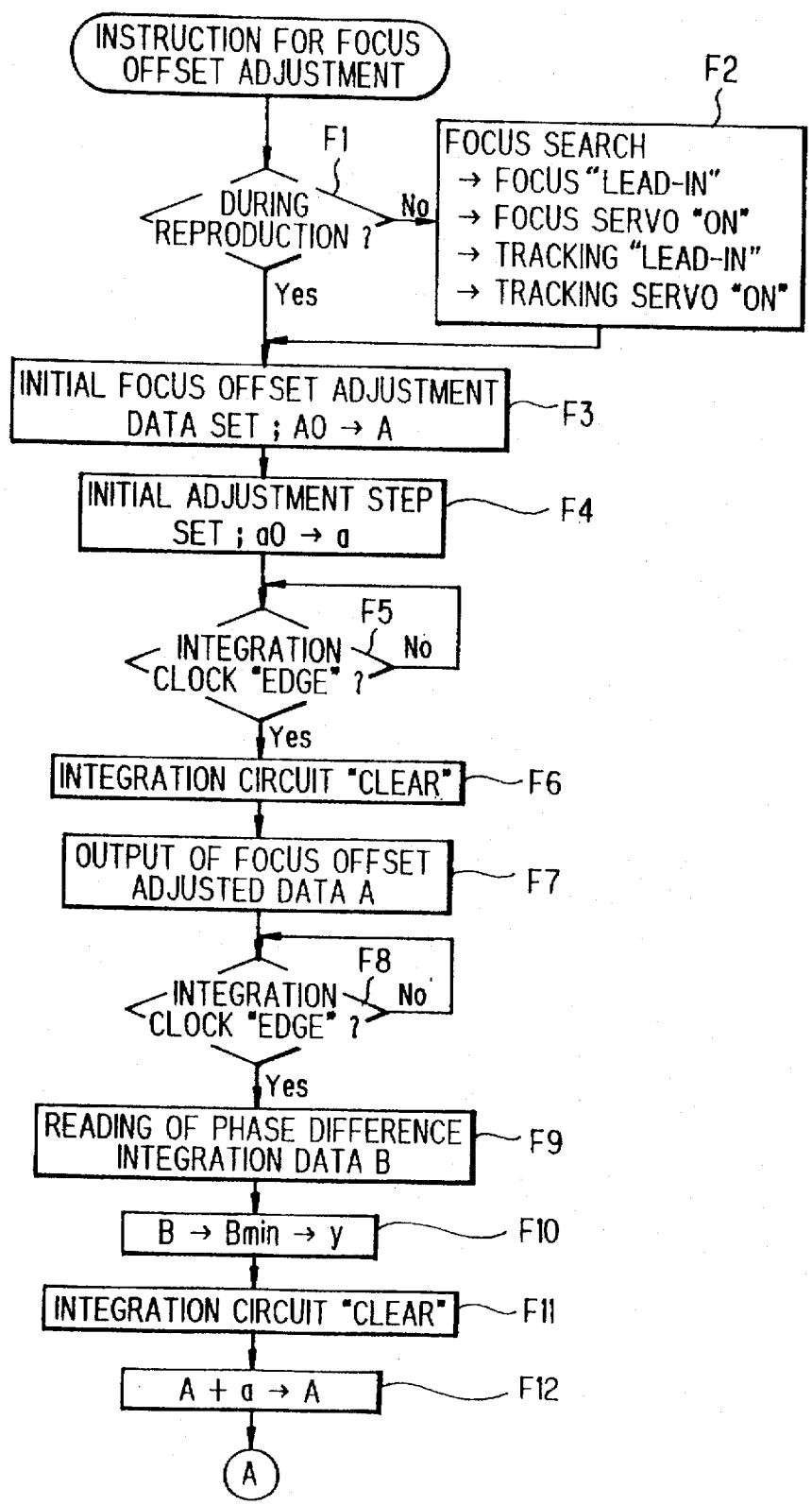
FIG. 5 is a flow chart showing the operation of the preferred embodiment of the present invention.
Figure 6:
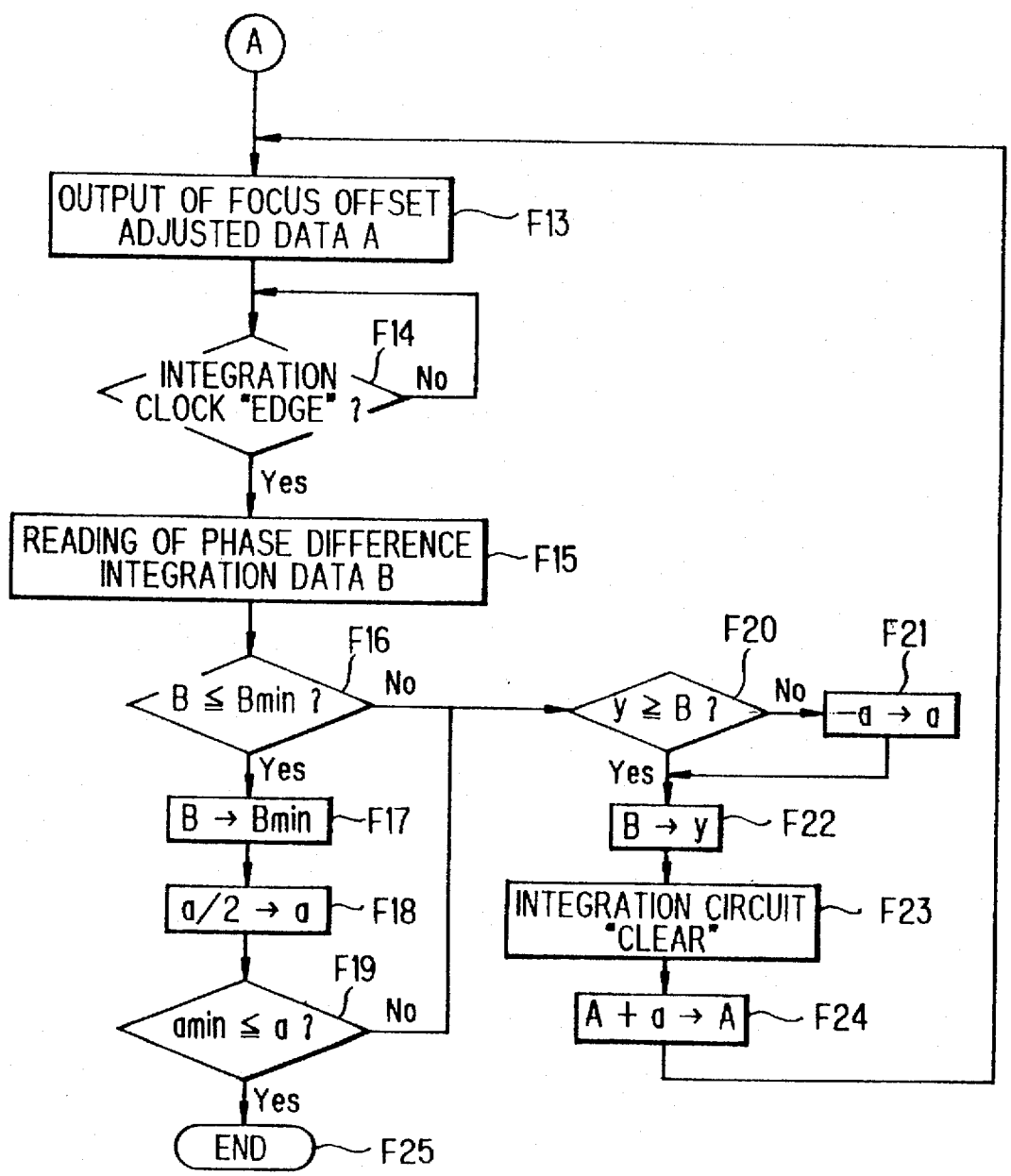
FIG. 6 is a flow chart showing the operation of the preferred embodiment of the present invention.
Figure 7:
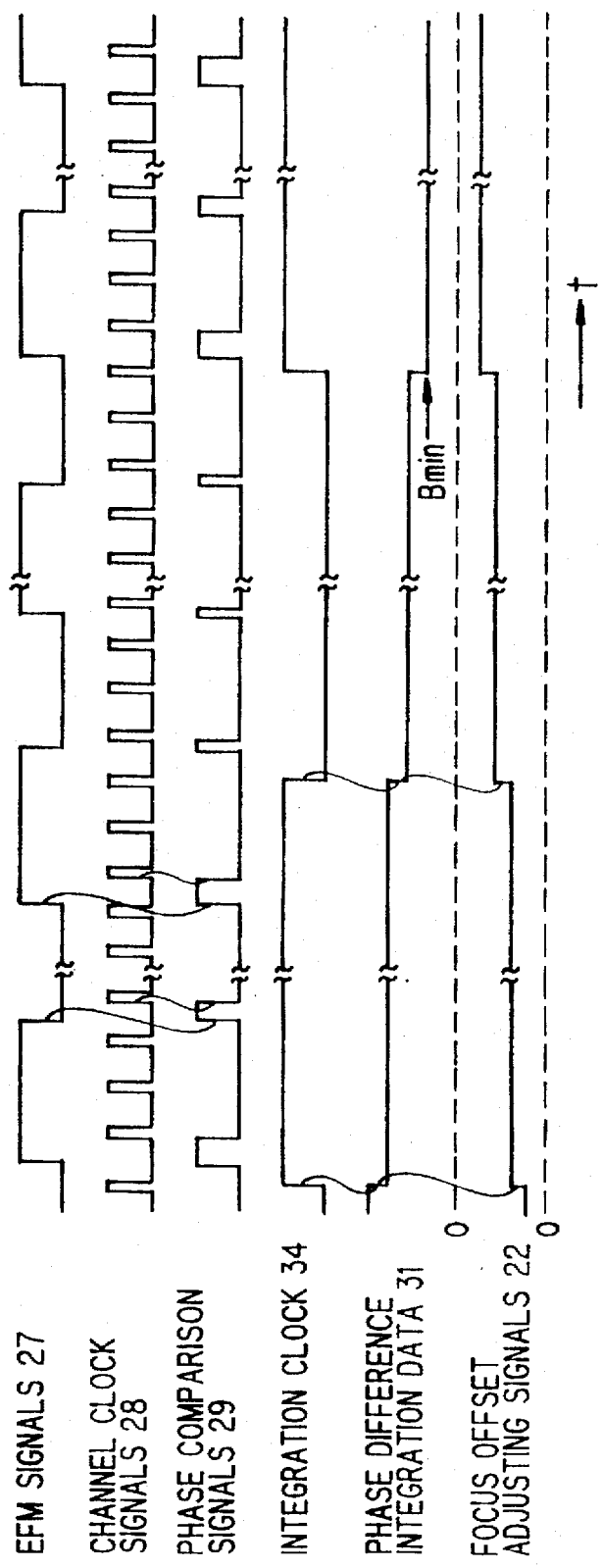
FIG. 7 is a timing chart showing the operation of an embodiment of the present invention.

FIGS. 5 and 6 are flow charts showing the operation of a microcomputer 11 shown in FIG. 2. FIG. 7 is an example of the timing chart of signals in each section at that time. The microcomputer 11 has ROM (read only memory), which pre-stores the process procedure of the flow chart shown in FIGS. 3 and 6, a data memory (RAM) necessary for executing the flow chart, and a processing unit (CPU).

The following at least five entries are provided for RAM (random access memory) as data memory. The first entry is an area for storing focus offset adjusting data 32 (A). The second entry is an area for storing step value a which stepwise changes the focus offset adjusting data A. The third entry is an area for storing phase difference integration signals 31 (B), the fourth area is an area for storing the minimum value Bmin of the phase difference integration signals 31, and the fifth entry is an area for storing preceding phase difference integration signals y.

At the time of turning the power of an optical disk device "on," when the focus offset adjustment is instructed, whether or not information is in reproduction is judged in step F1. If the information is in reproduction, the step is transferred to step F3. On the other hand, when the reproduction of the information is in stop, operations, such as focus search, focus "lead-in," focus servo "on," tracking "lead-in," and tracking servo "on," are performed in step F2 to bring the optical disk device to a reproduction state, and the step is then transferred to step F3.

In step F3, preset initial focus offset adjustment data AO are written in the first entry (A) of the data memory. The initial adjustment data AO are values corresponding to focus offset adjustment signals 22 falling within a value range wherein at least the reproduction operation is stable.

In step F4, predetermined initial adjustment step data aO are written in the second entry (a) of the data memory. The initial step data AO are values which fall within a value range, where at least the reproduction operation is stable, and are lower than those which permit a loop of F14 to F24 to be executed at least twice.

In step F5, when an edge of integration clocks 3 is detected, an integration circuit 8 is cleared in step F6. In step F7, data A in the first entry of the data memory is output as focus offset adjustment data 32, and the step is transferred to the next step, step F8. In step F8, when an edge of the integration clocks 3 is detected, in step F9, phase difference integration data 31 (B) are written in the third entry of the data memory. Subsequently, in step F10, the data in the entry are written as Bmin in each of the fourth and fifth entries (Bmin and y).

In step 11, the integration circuit 8 is cleared. In the next step, step F12, the sum of the data in the first entry (A) and the data in the second entry (a), (A+a), is written in the first entry (A), and the data in the entry (A) of step F13 is output as focus offset adjustment data 32.

When an edge of the integration clocks 3 is detected in step F14, phase difference integration data 31 (B) are written, in step F15, in the third entry (B). In step F16, the data B in this entry are compared with Bmin in the fourth entry. If B≦Bmin, the entry data B are written, in step F17, in the Bmin in the fourth entry, thereby updating the data. Subsequently, in step F18, the entry value a is halved, and in step F19, the minimum value amin of the preset step data is compared with a/2. The minimum value amin is a parameter which determines the accuracy and necessary time for the focus offset adjustment.

If amin<a, the focus offset adjustment is completed in step F25. On the other hand, if this requirement is not satisfied, the step is transferred to step F20. In step F16, if B≧Bmin is not satisfied, the step is transferred to step F20. In the step 20, the data y in the fifth entry are compared with B. Specifically, the preceding data By are compared with the current data B, and, if y≧5, the step is transferred to step F22, while if y<B, the polarity of the step data a in the second entry is inverted followed by transfer to step 22.

In the step 22, the data B in the third entry are brought to data y in the fifth entry, the integration circuit 8 is then cleared in step F23, the sum of the data A in the first entry and the data a in the second entry, (A+a), is written, in step F24, in the first entry, and the step is returned to the step 13.

However, when amin≦a is not satisfied and the focus offset adjustment is not completed, the necessary time for focus offset adjustment is limited, or alternatively the number of times of execution of the step F17 is counted. In this case, the focus offset adjustment is terminated as soon as the predetermined adjustment time or number of times of execution is reached.

When focus offset adjustment signals 22 are produced by the above processing so as to provide the minimum difference in phase 29 between EFM signals 27 and channel clock signals 28, they are stored in the data memory and continuously output, enabling the optimal focus offset adjustment to be performed. When the power source of the device is again turned "on," the processing shown in FIGS. 5 and 6 is performed again, permitting the optimal focus offset adjustment to be always performed, In optical disk devices, EFM signals containing self-clocks are generally processed. The present invention is applicable so far as the signal system contains self-clocks.

As described above, according to the present invention, an focus offset adjustment is automatically performed with a good accuracy, eliminating the need to adjust the focus offset at the time of assembly of the device and the delivery from factory. Further, it is possible to absorb all of a change in the device and element with the elapse of time, the state of the disk, and the environment of the operation, permitting the performance to be maintained.

Furthermore, the focus offset adjustment is automatically performed so as to render the jitter of reproduced signals of the optical disk minimum, enabling the best reproduced signals to be provided.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is;:

1. An optical disk device comprising: means for producing focus error signals regarding light applied to an optical disk; means for producing reproduced signals from the optical disk by means of the applied light; means for producing binary data signals of the reproduced signals and channel clock signals contained therein; phase difference production means for producing phase difference signals showing a difference in phase between the binary data signals and the channel clock signals; focus offset adjusting signal production means for producing focus offset adjusting signals according to the phase difference signals; and means for adding the focus offset adjusting signals to the focus error signals to produce focus servo signals, wherein the phase difference producing means comprises integration means, which calculates integration values of the phase difference for each given period, and the focus offset adjusting signal production means brings the focus offset adjusting signals to final focus offset adjusting signals while stepwise changing the focus offset adjusting signals from a preset initial value, said focus offset adjusting signal production means comprises means for stepwise changing the focus offset adjusting signals from the preset initial value, comparison means for successively comparing the resultant integration value provided by the integration means with a preceding integration value, minimum value detection means for determining a minimum value of the integration values based on the results of the comparison, and memory means for storing a focus offset adjusting signal corresponding to the detected minimum value, and the signal stored in the memory means is used as the final focus offset adjusting signals.

\* \* \* \* \*